(12) United States Patent
Huang et al.

(10) Patent No.: US 12,130,176 B2
(45) Date of Patent: Oct. 29, 2024

(54) SINGLE-PHOTON TIMING SYSTEM AND METHOD

(71) Applicant: THE REGENTS OF THE UNIVERSITY OF COLORADO, A BODY CORPORATE, Denver, CO (US)

(72) Inventors: Shu-Wei Huang, Broomfield, CO (US); Bowen Li, Boulder, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 0 days.

(21) Appl. No.: 18/287,829

(22) PCT Filed: Apr. 20, 2022

(86) PCT No.: PCT/US2022/025544
§ 371 (c)(1),
(2) Date: Oct. 20, 2023

(87) PCT Pub. No.: WO2022/226066
PCT Pub. Date: Oct. 17, 2022

(65) Prior Publication Data
US 2024/0183709 A1 Jun. 6, 2024

Related U.S. Application Data

(60) Provisional application No. 63/177,031, filed on Apr. 20, 2021.

(51) Int. Cl.
*G01J 1/44* (2006.01)
*G01J 3/18* (2006.01)
*G01J 3/28* (2006.01)

(52) U.S. Cl.
CPC .............. *G01J 1/44* (2013.01); *G01J 3/1895* (2013.01); *G01J 3/2803* (2013.01); *G01J 2001/442* (2013.01)

(58) Field of Classification Search
CPC .......... G01J 1/44; G01J 3/1895; G01J 3/2803; G01J 2001/442; G01J 3/2889;
(Continued)

(56) References Cited

U.S. PATENT DOCUMENTS

2023/0367176 A1\* 11/2023 Clemmen ............... G02F 1/395

OTHER PUBLICATIONS

Donohue, J M, M Mastrovich, and K J Resch. "Spectrally Engineering Photonic Entanglement with a Time Lens." Physical review letters 117.24 (2016): 243602-243602. Web. (Year: 2016).\*

(Continued)

*Primary Examiner* — Thanh Luu
*Assistant Examiner* — Monica T Taba
(74) *Attorney, Agent, or Firm* — Cozen O'Connor

(57) ABSTRACT

A time-to-frequency converter transforms an initial single-photon pulse into a transformed pulse such that the temporal waveform of the initial pulse is mapped to the spectrum of the transformed pulse. The time-to-frequency converter includes a dispersive optical element followed by a time lens. The spectrum of the transformed pulse is then measured to determine the arrival time of the initial pulse. The spectrum can be measured using a photon-counting spectrometer that spatially disperses the transformed pulse onto an single-photon detector array. Alternatively, an additional dispersive element can be used with the time-to-frequency converter to implement a time magnifier. The arrival time of the resulting time-magnified pulse can then be measured using time-correlated single-photon counting. This arrival time can then be divided by the magnification factor of the time magnifier to obtain the arrival time of the initial pulse.

20 Claims, 7 Drawing Sheets

(58) Field of Classification Search
CPC ...... G01J 3/0208; G01J 3/0218; G01J 3/0264; G01J 2001/4238; G01J 3/2823; G01J 11/00
See application file for complete search history.

(56) References Cited

OTHER PUBLICATIONS

PCT/US2022/025544 International Search Report and Written Opinion dated Aug. 3, 2022, 6 pages.
A. O. C. Davis et al., "Pulsed single-photon spectrometer by frequency-to-time mapping using chirped fiber Bragg gratings," Opt. Express, vol. 25, No. 11, May 24, 2017, pp. 12804-12811.
M. Karpinski et al., "Bandwidth manipulation of quantum light by an electro-optic time lens," arXiv:1604.02459v2, Jul. 30, 2017, 13 pages.
G. Patera et al., "Space-time duality and quantum temporal imaging," Phys. Rev. A 98, 053815, Nov. 12, 2018.
M. T. Kauffmann et al., "Applications of Time-Lens Optical Systems," in Ultrafast Electronics and Optoelectronics, J. Shah and U. Mishra (eds.), vol. 14 of OSA Proceedings Series (Optica Publishing Group, 1993), paper E5, pp. 169-171.
C. V. Bennett and B. H. Kolner, "Principles of Parametric Temporal Imaging—Part I: System Configurations," IEEE J. Quantum Electron., vol. 36, No. 4, Apr. 2000, pp. 430-437.
B. Li et al., "Panoramic-reconstruction temporal imaging for seamless measurements of slowly-evolved femtosecond pulse dynamics," Nat. Commun., vol. 8, No. 61, Jul. 5, 2017, 10 pages.
Y. Duan et al., "Ultrafast electrical spectrum analyzer based on all-optical Fourier transform and temporal magnification," Opt. Express, vol. 25, No. 7, Mar. 23, 2017, pp. 7520-7529.
M. A. Foster et al., "Silicon-chip-based ultrafast optical oscilloscope," Nature vol. 456, Nov. 6, 2008, pp. 81-84.
A. Pasquazi et al., "Measurement of ultrashort optical pulses via time lens imaging in CMOS compatible waveguides," arXiv:1705.02570, May 2017, 8 pages.
R. Salem et al., "Application of space-time duality to ultrahigh-speed optical signal processing," Adv. Opt. Photon., vol. 5, No. 3, Aug. 21, 2013, pp. 274-317.
B. H. Kolner, "Space-Time Duality and the Theory of Temporal Imaging," IEEE J. Quantum Electron., vol. 30, No. 8, Aug. 1994, pp. 1951-1963.

\* cited by examiner

SINGLE-PHOTON TIMING SYSTEM AND METHOD

RELATED APPLICATIONS

This application claims priority to U.S. Provisional Patent Application No. 63/177,031, filed Apr. 20, 2021 and titled "Systems and Methods for Time-Magnified Photon Counting", the entirety of which is incorporated herein by reference.

STATEMENT REGARDING FEDERALLY SPONSORED RESEARCH OR DEVELOPMENT

This invention was made with government support under grant number 1021188 awarded by the National Science Foundation, and grant number N00014-19-1-2251 awarded by the Office of Naval Research. The government has certain rights in the invention.

BACKGROUND

Time-correlated single-photon counting may be used for low-light fluorescence lifetime spectroscopy, time-gated Raman spectroscopy, and photon-counting time-of-flight three-dimensional imaging.

SUMMARY

Time-resolved photon counting plays an indispensable role in precision metrology, both in the classical and quantum regimes. One example of time-resolved photon counting is time-correlated single-photon counting (TCSPC), which has enabled applications such as low-light fluorescence lifetime spectroscopy and microscopy, time-gated Raman spectroscopy, photon counting time-of-flight (ToF) three-dimensional (3D) imaging, light-in-flight imaging, and computational diffuse optical tomography. For these applications, and others, an important figure-of-merit is the single-photon timing resolution (SPTR), which directly affects the measurement accuracy and precision. Parameters that may be determined from these measurements, and therefore limited by SPTR, include fluorescence-decay lifetime, Raman spectral resolution, ToF distance, and spatial resolution.

The SPTR for conventional TCSPC setups is typically between 10 and 1000 ps, limited by single-photon detector technology. For example, photomultiplier tubes, despite their broad spectral coverage, typically provide an SPTR greater than 100 ps. Furthermore, the use of such vacuum-based devices has been limited due to their fragility, intrinsic deterioration with age, and bulkiness. As another example, superconducting-nanowire single-photon detectors have achieved SPTRs less than 10 ps. However, they require cryogenic cooling, which significantly increases complexity and cost. As another example, single-photon avalanche diodes (SPADs) operate at room temperatures and their CMOS compatibility enables integration with two-dimensional detector arrays. Nevertheless, their SPTR is still limited to tens of picoseconds in the near-infrared, even with a customized fabrication process.

The present embodiments implement time-lens-based optical signal processing techniques that can improve the SPTR by orders of magnitude, thereby bridging the gap between the accuracy and limited SPTR of conventional time-resolved photon counting. In many of these embodiments, a time-to-frequency converter maps the instantaneous amplitude of an initial single-photon pulse to the frequency domain. Spectral measuring techniques may then be used to determine temporal features of this initial pulse. As described in more detail below, one of the present embodiments was used to experimentally demonstrate a SPTR as low as 550 fs using off-the-shelf single-photon detectors. Ultrashort pulses with a 130-fs pulsewidth difference were resolved with an accuracy of 22 fs.

In some embodiments, a parametric time lens creates a temporal magnifier that stretches an initial single-photon pulse by a temporal magnification factor M. The resulting temporally-stretched pulse is then measured using conventional TCSPC. The measured arrival time of the stretched pulse is divided by M to obtain the arrival time of the initial pulse. This technique, which is referred to herein as time-magnified TCSPC (TM-TCSPC), effectively improves SPTR by a factor of M.

In other embodiments, a spectrometer directly measures the spectrum of a transformed pulse outputted by the parametric time lens. The spectrometer spatially disperses the transformed pulse (e.g., with a grating) onto an array of single-photon detectors. The arrival time of the initial pulse is identified by the frequency of the transformed pulse, and therefore which pixel of the array detected the photon. These embodiments reduce the pile-up effect of the detectors, advantageously allowing the data to be acquired at a higher count rate. These embodiments can also achieve a longer record length than those implementing TM-TCSPC.

The present embodiments may be used to improve photon counting at the femtosecond regime. Applications that may benefit include low-light fluorescence lifetime spectroscopy and microscopy, time-gated Raman spectroscopy, photon-counting time-of-flight three-dimensional imaging, light-in-flight imaging, and computational diffuse optical tomography.

DETAILED DESCRIPTION

Figure 1:
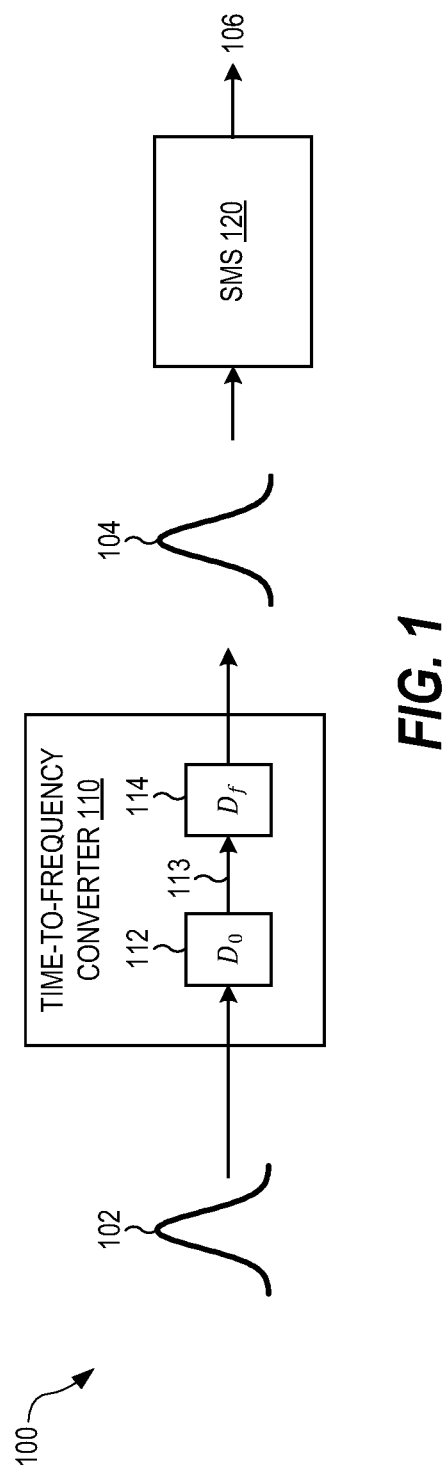
FIG. 1 is a functional diagram of a single-photon timing system, in embodiments.

FIG. 1 is a functional diagram of a single-photon timing system 100. The system 100 includes a time-to-frequency converter 110 that transforms an initial single-photon pulse 102 into a transformed single-photon pulse 104. The system 100 also includes a spectrum-measuring system (SMS) 120 that measures the spectrum of the transformed pulse 104 to determine an arrival time 106 of the initial pulse 102. The SMS 120 may also output the determined arrival time 106. For example, the SMS 120 may transmit the arrival time 106 as a digital value to a remote computing device, memory, or display.

Each of the pulses 102 and 104 is "single-photon" in that, upon detection by a single-photon detector, the single-photon detector will output an electrical signal corresponding to a single photon. Each of the pulses 102 and 104 has a frequency spectrum that lies in the visible, ultraviolet, infrared, or THz regimes of the electromagnetic spectrum, or a combination thereof. In many of the present embodiments, the pulses 102 and 104 lie in the near-infrared or infrared, which advantageously allows the pulses 102 and 104 to be processed using readily-available low-loss fiber-optic components, bulk optical components, high-power laser sources, and high-efficiency detectors.

The time-to-frequency converter 110 maps the instantaneous amplitude, or envelope function, $A_0(t)$ of the initial pulse 102 to the frequency domain. In embodiments, the time-to-frequency converter 110 includes an initial dispersive element 112 that applies an initial group delay dispersion $D_0$ to the initial pulse 102. The output of the dispersive element 112 is a chirped single-photon pulse 113 that can be represented mathematically as $$A_c(t) = \int_{-\infty}^{+\infty} A_0(\tau) \exp\left(i\frac{(t-\tau)^2}{2D_0}\right) d\tau. \quad (1)$$

Note that the phase of the initial pulse 102 can be ignored in Eqn. 1 since it is not needed for determining the arrival time of the initial pulse 102.

The time-to-frequency converter 110 also includes a time lens 114 that applies a quadratic phase shift to the chirped pulse 113 within a time gating window. The output of the time lens 114 is the transformed single-photon pulse 104. The quadratic phase shift is also referred to as a focal group delay dispersion $D_f$. The time gating window is represented by a gating function $G(t)$. The temporal transfer function $L(t)$ of the time lens 114 is $$L(t) = G(t) \exp\left(i\frac{t^2}{2D_f}\right). \quad (2)$$

Therefore, the transformed pulse 104 can be expressed mathematically as $$A_t(t) = \int_{-\infty}^{+\infty} A_0(\tau)G(t)\exp\left(i\frac{(t-\tau)^2}{2D_0}\right)\exp\left(i\frac{t^2}{2D_f}\right)d\tau. \quad (3)$$

The time lens 114 may be temporally "placed" one focal length away from the chirped pulse 113, in which case $D_f = -D_0$. Eqn. 3 then simplifies to $$A_c(t) = \int_{-\infty}^{+\infty} A_0(\tau)G(t) \exp\left(i\frac{\tau^2}{2D_0}\right)\exp\left(-i\frac{t\tau}{D_0}\right)d\tau \quad (4)$$

$$= G(t)\mathcal{F}\left(A_0\left(\frac{t}{D_0}\right)\exp\left(i\frac{t^2}{2D_0^3}\right)\right),$$

where $\mathcal{F}$ denotes the Fourier transform. The spectrum $\tilde{A}_t(\omega)$ of the transformed pulse 104 can be obtained by Fourier transforming Eqn. 4:

$$\tilde{A}_t(\omega) = \int_{-\infty}^{+\infty} G(t)\mathcal{F}\left(A_0\left(\frac{t}{D_0}\right)\exp\left(i\frac{t^2}{2D_0^3}\right)\right)\exp(i\omega t)dt \quad (5)$$

$$= \tilde{G}(\omega) * A_0\left(\frac{\omega}{D_0}\right)\exp\left(i\frac{\omega^2}{2D_0^3}\right).$$

Eqn. 5 shows that the spectrum $\tilde{A}_t(\omega)$ of the transformed pulse 104 is proportional to the instantaneous waveform $A_0(t)$ convolved with the Fourier transform $\tilde{G}(\omega)$ of the gating function $G(t)$. When the gating function is long enough that $\tilde{G}(\omega)$ can be considered a delta function relative to the spectrum bandwidth, the time-to-frequency converter 110 maps temporal features of the initial pulse 102 to the spectrum of the transformed pulse 104 according to the relationship $\omega = t/D_0$, or $\lambda = t/(D_0 * L)$, where L is the length of a dispersive material having a material dispersion coefficient $D_0^*$.

For a time gating window of duration T, the minimum resolvable spectral width is approximately 1/T, and therefore the temporal resolution of the instantaneous amplitude $A_s(t)$ that can be obtained by measuring $\tilde{A}_t(\omega)$ is $D_0/T$. In some embodiments, the time lens 114 is parametric, in which case the chirped pulse 113 is nonlinearly mixed with a chirped pump pulse. Therefore, the duration T, which is also referred to as the "length" of the time-lens window, can be expressed as $T = D_0 B_p$, where $B_p$ is the bandwidth of the pump. The duration T represents the record length of the fluorescence signal measurement. The fundamental timing resolution therefore scales as $1/B_p$, and the record length is fully filled when the bandwidth $B_s$ of the transformed pulse 104 is the same as the pump bandwidth $B_p$, or $B_s = T/D_0$.

The SMS 120 may be any of several devices that fall within two categories. In the first category, the SMS 120 directly measures the spectrum of the transformed pulse 104 by spatially dispersing it (e.g., with a diffractive grating or refractive prism). Examples of the SMS 120 in this first category include single-photon optical spectrometers and optical spectrum analyzers (see FIG. 8). In the second category, the transformed pulse 104 is Fourier-transformed to map its spectrum into the time domain. The pulse can then be temporally measured without spatial dispersion (e.g., with a single-photon detector).

Figure 2:
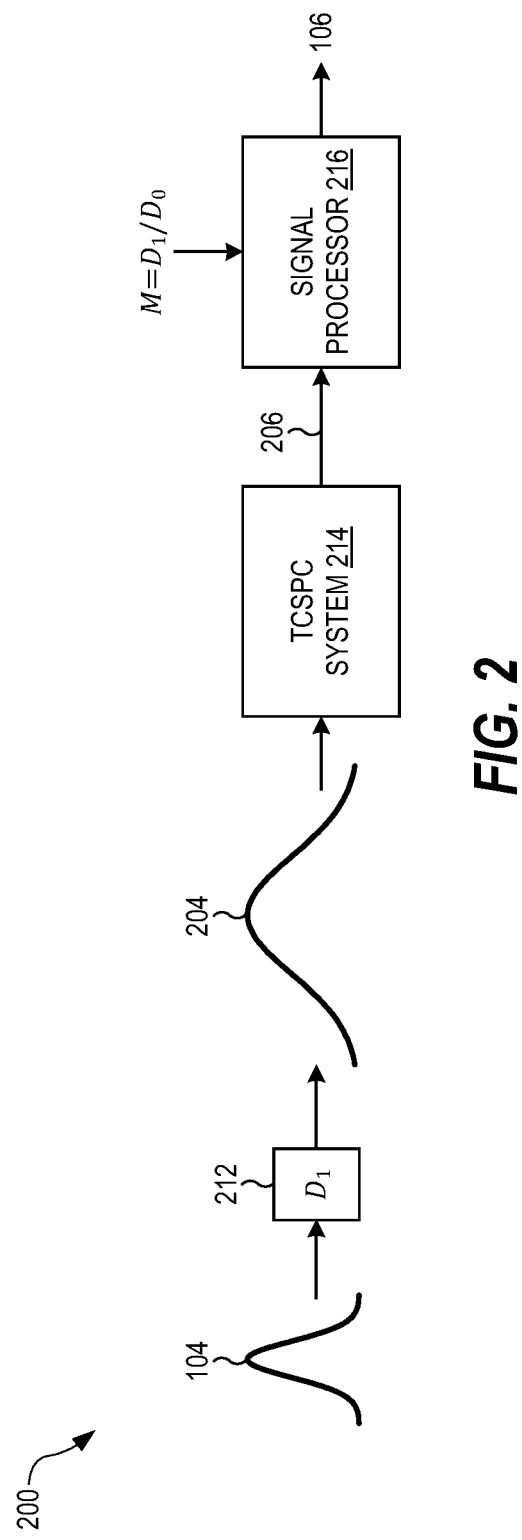
FIG. 2 is a functional diagram of a spectrum-measuring system (SMS) that may be used with the single-photon timing system of FIG. 1, in an embodiment.

FIG. 2 is a functional diagram of an SMS 200 that is one example of the SMS 120 of FIG. 1. The system 100, when implemented with the SMS 200, performs what is referred to herein as time-magnified time-correlated single-photon counting (TM-TCSPC). The SMS 200, which falls in the second category of SMS devices described above, includes a final dispersive element 212 that applies a final group delay dispersion $D_1$ to the transformed pulse 104. The final group delay dispersion $D_1$ is much larger than the initial group delay dispersion $D_0$, i.e., $D_1 \gg D_0$. In this case, the initial dispersive element 112, time lens 114, and final dispersive element 212 cooperatively form a time magnifier that temporally stretches, or expands, the initial pulse 102 by a time-magnification factor $M=D_1/D_0>1$. The output of the final dispersive element 212 is a time-magnified single-photon pulse 204 whose instantaneous amplitude $A_{TM}(t)$ is approximately equal to $A_0(Mt)$.

The relatively large value of the final group delay dispersion $D_1$ may be thought of as implementing far-field Fraunhofer diffraction. Accordingly, the final dispersive element 212 acts like a frequency-to-time converter that Fourier transforms the spectrum $\tilde{A}_t(\omega)$ of the transformed pulse 104 into the instantaneous amplitude $A_{TM}(t)$ of the time-magnified pulse 204. However, group delay dispersion does not change the spectrum of a pulse, and therefore the time-magnified pulse and transformed pulse 104 have the same spectrum. The time magnification arises because the time-to-frequency converter 110 reduces bandwidth, i.e., the transformed pulse 104 has a narrower spectrum than the initial pulse 102. This narrower spectrum gives rise to a broader pulse (i.e., the time-magnified pulse 204) in the time domain.

The SMS 200 also includes a time-correlated single-photon counting (TCSPC) system 214 that performs conventional TCSPC with the time-magnified pulse 204 to measure a time-magnified arrival time 206 of the time-magnified pulse 204. The SMS 200 may also include an electronic signal processor 216 that calculates the arrival time of the initial pulse 102 by dividing the time-magnified arrival time 206 by the time-magnification factor M. The processor 216 may then output the determined arrival time 106.

To see how TM-TCSPC reduces the single-photon timing resolution (SPTR), consider conventional TCSPC performed with the initial pulse 102. In this case, the SPTR is limited by the timing resolution of the single-photon detector used to detect the initial pulse 102. For the SMS 200, the SPTR of the conventional TCSPC system 214 is also limited by this detector-limited timing resolution. However, the subsequent division of the time-magnified arrival time 206 by the time-magnification factor M effectively reduces the SPTR by a factor of M. As described in more detail below, M can easily be 100, or more. Accordingly, TM-TCSPC can reduce the SPTR of conventional TCSPC by two orders of magnitude, or more.

Figure 3:
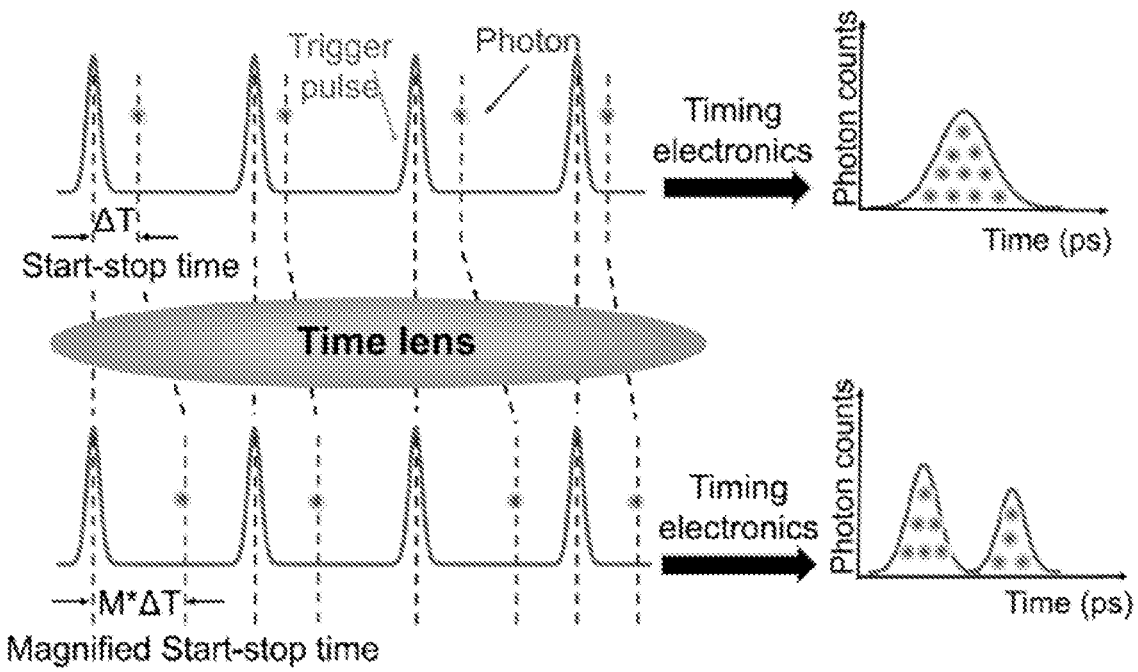
FIG. 3 explains time-magnified time-correlated single-photon counting (TM-TCSPC), in embodiments.

FIG. 3 explains TM-TCSPC in more detail. In conventional TCSPC (see the upper row of FIG. 3), the start-stop time $\Delta T$ between an excitation pulse and emission photon is registered and logged by TCSPC timing electronics. A TCSPC timing histogram of photon arrival times referenced to the excitation pulse is constructed by repeated measurements. Provided the probability of registering more than one photon per cycle is low, the TCSPC timing histogram depicts the time-resolved intensity profile of the signal under test (SUT) at the quantum level. The initial pulse 102 of FIG. 1 is one example of a SUT. Depending on the choice of single-photon detectors, the TCSPC time resolution is in the range of 10-100 ps. In the TM-TCSPC system (see the lower row of FIG. 3), the quantum-level SUT is first temporally magnified before being characterized by the subsequent TCSPC system. The SPTR of the TM-TCSPC is thus significantly improved by the temporal magnification ratio, reaching the femtosecond regime for the first time. To implement the temporal magnifier that preserves the SUT quantum coherence, a fiber parametric time lens based on four-wave-mixing beamsplitter (FWM-BS) was developed. FWM-BS is advantageous for quantum applications due to its noiseless nature and near-unity conversion efficiency. Moreover, the flexibility of choosing pump wavelength also enables processing quantum-level SUT over a large wavelength range.

Figure 4:
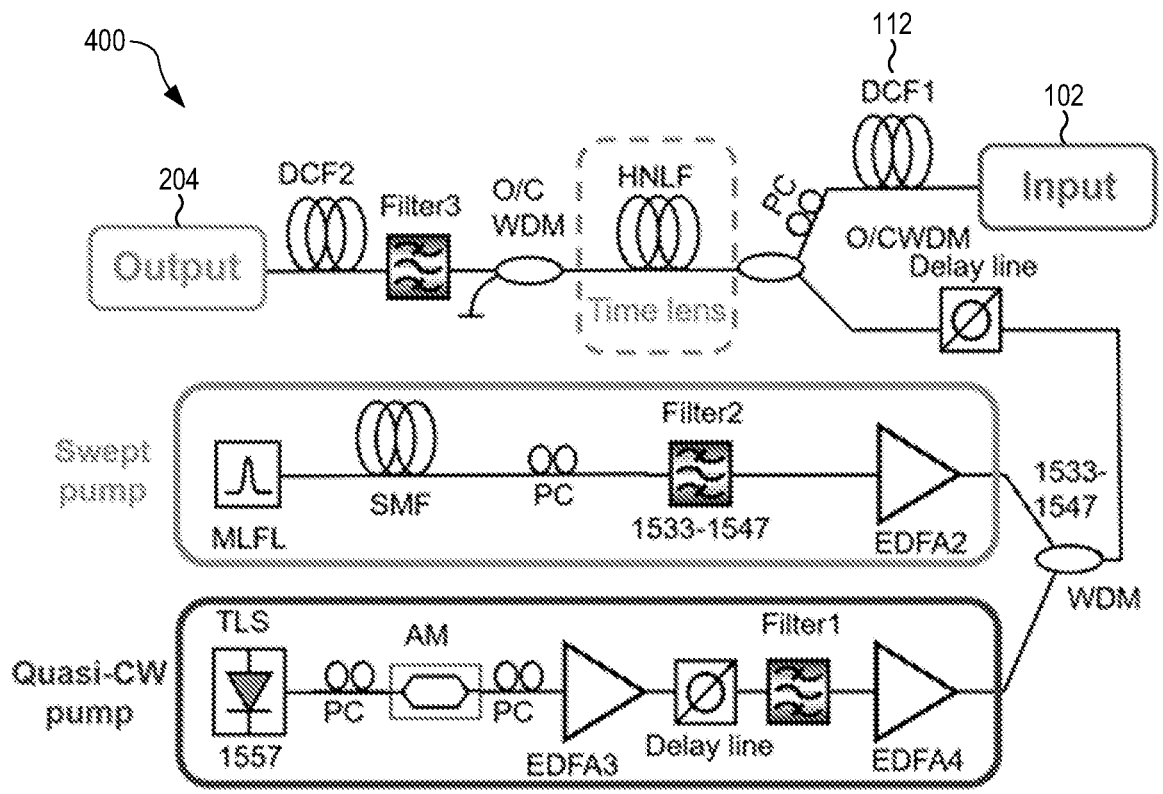
FIG. 4 shows an experimental set-up for TM-TCSPC, in an embodiment.

FIG. 4 shows an experimental set-up 400 for TM-TCSPC. The set-up 400 is one embodiment of the system 100 of FIG. 1 implemented with the SMS 200 of FIG. 2. The fiber parametric time lens was implemented using a spool of 30-m highly nonlinear fiber (HNLF) and two optical pumps. First, a swept pump was generated by chirping a 100-MHz mode-locked erbium-doped fiber laser (MLFL) through 680-m single-mode fiber (SMF) to obtain a pump dispersion of $-15.12$ ps$^2$. For clarity, this swept pump is also referred to herein as a "linearly-chirped pump". It was then band-pass filtered at 1540 nm at a bandwidth of 14 nm and subsequently amplified by an erbium-doped fiber amplifier (EDFA). The swept pump pulse duration is stretched to 165 ps, defining the aperture of the time lens. At the same time, a quasi-continuous-wave (CW) pump was generated from a tunable laser source (TLS) operating at 1558 nm. An amplitude modulator (AM) synchronized with the swept pump modulated the CW TLS into 360-ps pulses, which was then amplified by two EDFAs as the quasi-CW pump. A 0.7-nm bandwidth filter was deployed between the two EDFAs to suppress the amplified spontaneous emission (ASE) noise. The two pumps were then combined through a wavelength-division multiplexer (WDM) and temporally overlapped using an optical tunable delay line.

The SUT was a sub-ps pulse with 5-nm bandwidth at 1255 nm obtained through supercontinuum generation of the same MLFL, and it was thus optically synchronized with the two pumps. The SUT then propagated through 200-m of dispersion compensating fiber (DCF), which provided an input dispersion of 15 ps$^2$. Finally, the pumps and the SUT were combined using an O/C band WDM and then launched together into the 30-m HNLF with a nonlinear coefficient $\gamma=24$ (W$^{-1}$ km$^{-1}$) and a zero-dispersion wavelength of 1395 nm. The pumps and the HNLF formed a time lens, which induced quadratic phase modulation onto the SUT through FWM-BS. The peak power of the swept pump ($P_1$) and the quasi-CW pump ($P_2$) were adjusted such that $P_1=P_2$, and $(P_1+P_2)\cdot\gamma\cdot L=\pi$ in the HNLF to achieve the highest conversion efficiency during FWM-BS. After the time lens, a narrow-band idler generated through FWM-BS was filtered out before it propagated through 2 DCF modules that provide a total output dispersion of 1958 ps$^2$. Overall, the system functions as a temporal magnifier, and the output is a temporally magnified SUT, which would then be characterized by the subsequent TCSPC system that consisted of a near-infrared SPAD and timing electronics.

Figure 5A:
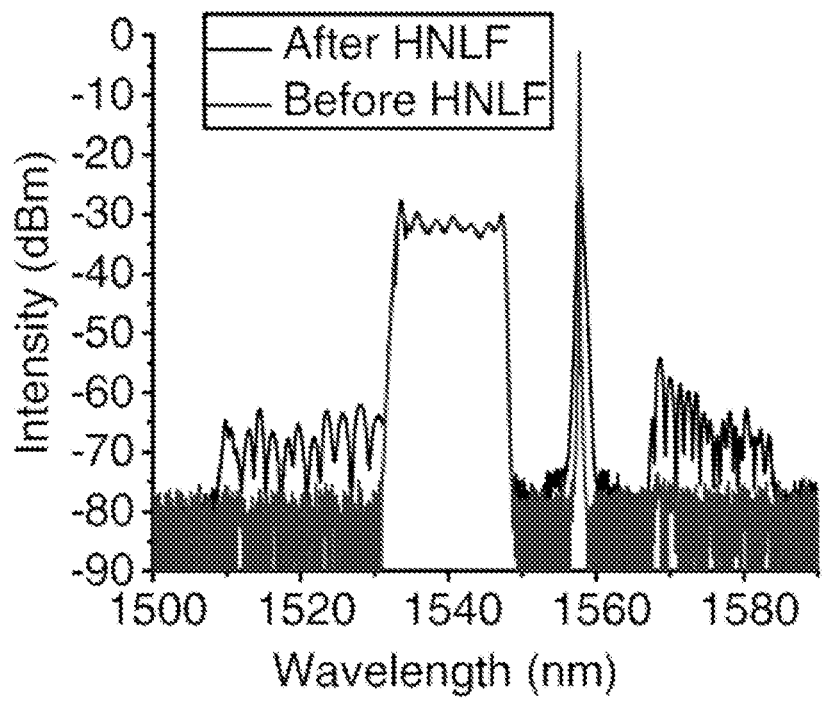
FIG. 5A shows a pump-band optical spectrum measured with the experimental set-up shown in FIG. 4.
Figure 5B:
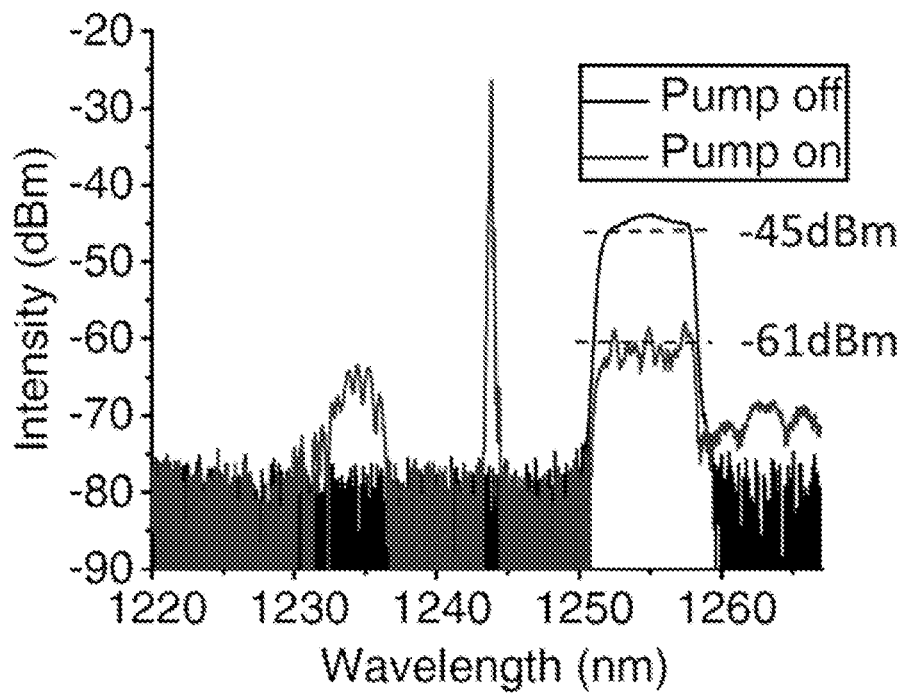
FIG. 5B shows a signal-band optical spectrum measured with the experimental set-up shown in FIG. 4.

FIGS. 5A and 5B show optical spectra measured with the experimental set-up shown in FIG. 4. Owing to the large spectral separation between the signal and the pump, the spectra were measured at the pump band (FIG. 5A) and signal band (FIG. 5B) individually. As shown in FIG. 5A, the pumps consisted of a 14-nm swept pump centered at 1540 nm and a quasi-CW pump centered at 1558 nm. The spectral modulations of the swept pump are inherited from the spectrum of the MLFL. After passing through the HNLF, some inevitable parasitic FWM processes happened between the two pumps. However, their influence was negligible because the conversion efficiency is less than 0.1% and they are spectrally separated from the SUT. As shown in FIG. 5B, when the two pumps were turned on, the 5-nm signal at 1255 nm was converted to a narrow band idler at 1244 nm with a close-to-unity conversion efficiency, and the frequency separation between the signal and idler equaled the frequency difference between the two pumps. Compared to the initial signal, more than 16 dB of signal depletion was achieved. Similar to the pump side, some parasitic FWM could be observed. However, this only amounted to 0.76% of the original signal power. Therefore, 97% of the signal was efficiently converted to the narrow band idler. The efficiency could be further improved towards unity by optimizing the spectral flatness of the swept pump. A free-space grating monochromator was used to filter out the 1244-nm idler with a 100-dB extinction ratio.

Using TCSPC to characterize the temporally magnified SUT, the SPAD was operated in gated mode with a gate-on time of 5 ns and a gate frequency of 25 MHz synchronized with the SUT. The hold-off time for the SPAD was set to 5 μs to suppress afterpulsing. Under such settings, the dark count was found to be 6,000/s. To reduce the pile-up effect, the input to the SPAD was attenuated such that the maximum detection probability per gate was 1%. Therefore, the maximum counting rate was about 110,000/s.

Figures 6A, 6B, 6C:
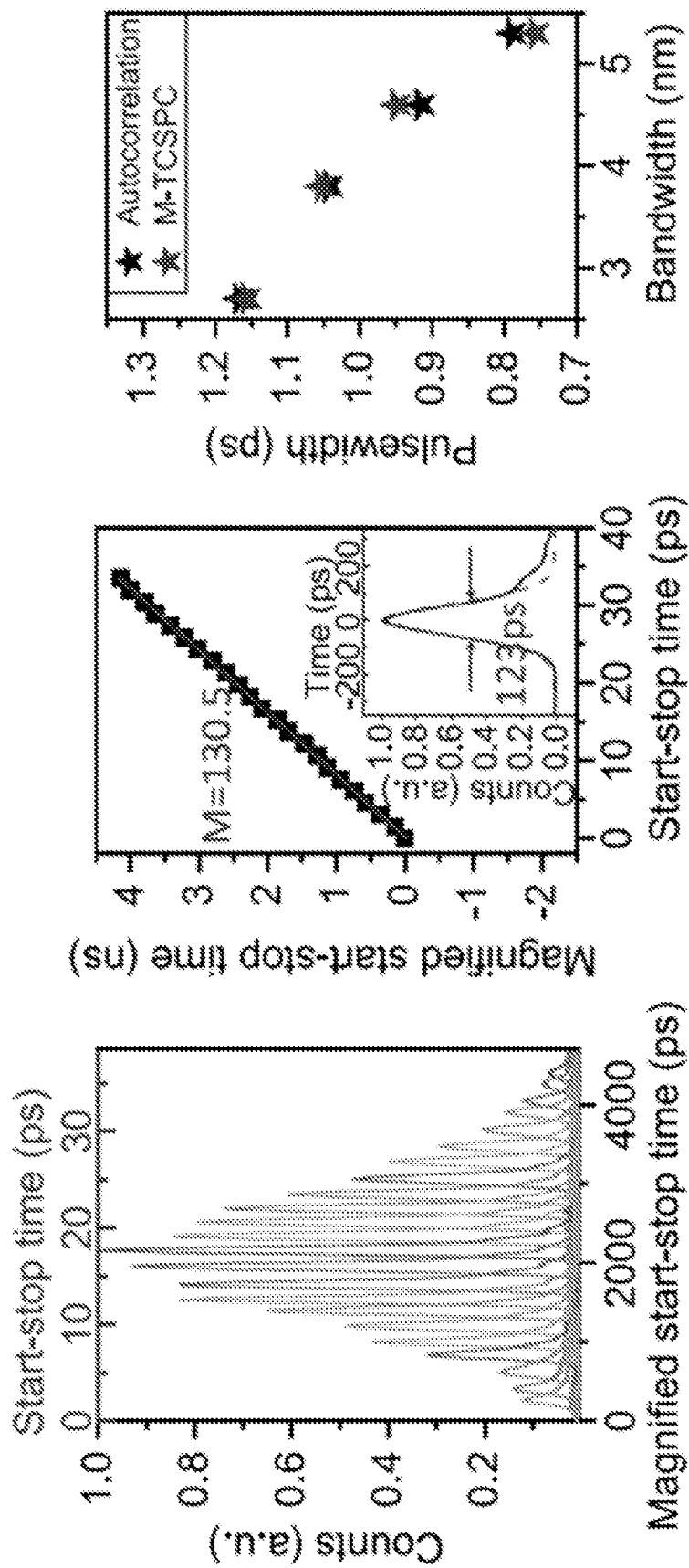
FIG. 6A shows TM-TCSPC timing histograms obtained with different start-stop times.
FIG. 6B is a plot of magnified start-stop time as a function of the unmagnified start-stop time.

FIG. 6A shows TM-TCSPC timing histograms obtained with different start-stop times. The FWM-BS conversion efficiency gradually rolled off as the start-stop time increases. The 10-dB record length was measured to be 30 ps, which is only 18% of the available 165-ps aperture of the time lens owing to the restriction of phase matching. Therefore, the record length can be further expanded by using HNLF with a lower dispersion slope.

FIG. 6B is a plot of the magnified start-stop time as a function of the unmagnified start-stop time within the 30-ps record length. This plot shows a linear relationship with a slope of 130, which is similar to the temporal magnification ratio M. The inset of FIG. 6B shows the central portion of the histogram in FIG. 6A. This inset shows a full-width at half maximum of 123 ps.

To demonstrate the potential of TM-TCSPC in ultrafast fluorescence lifetime measurement, we analyzed its capability to resolve small pulsewidth changes of about 130 fs. SUTs with four different pulsewidths were first calibrated with a background-free second harmonic generation intensity autocorrelator (AC) and then measured using the TM-TCSPC system of FIG. 4. Evidently, the TM-TCSPC can differentiate all four SUTs with different pulsewidths. An unprecedentedly short SPTR of 550 fs was estimated by fitting these measurements. FIG. 6C is a plot of the TM-TCSPC-measured pulsewidths (lighter stars) and the AC-calibrated pulsewidths (black stars). This plot shows excellent agreement with an r.m.s. fitting error of only 22 fs.

At zero start-stop time, the sensitivity of the system was also characterized and the minimum measurable SUT power was −67 dBm, corresponding to about 20 photons per pulse. The sensitivity is currently limited by the dark count of the SPAD and the large insertion loss of the output DCF modules (32 dB). Detection sensitivity of −95 dBm (0.03 photons per pulse) was measured before the DCF modules, which was then limited by the spontaneous Raman scattering noise. Therefore, by replacing the DCF modules with a low-loss chirped fiber Bragg grating (CFBG), the sensitivity of the system can be significantly enhanced by 28 dB, allowing efficient processing and characterization of quantum-level SUT.

Figure 7A:
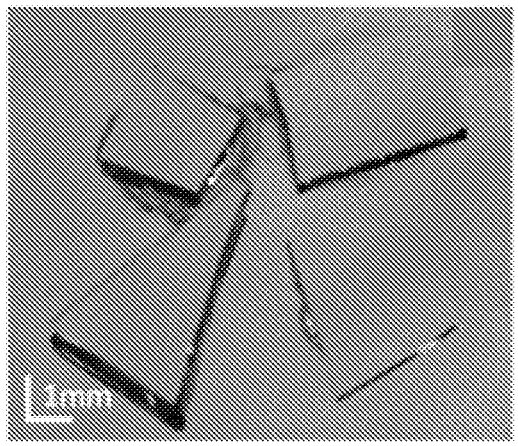
FIG. 7A shows images of four pieces of glass with different heights glued onto a glass slide.

Finally, photon-counting time-of-flight (ToF) 3D imaging was demonstrated to further highlight the benefit of sub-ps time resolution of TM-TCSPC, where its unprecedented 550-fs SPTR is translated to 82-μm depth resolutions in air. As shown in FIG. 7A, the imaging sample consisted of four small pieces of glass with different heights glued onto a glass slide, which was then sputtered with chromium coating to eliminate multi-surface reflection. The heights of the four glass pieces were independently characterized to be 520 μm (upper left), 400 μm (upper right), 990 μm (lower left), and 180 μm (lower right) using spectral-domain optical coherence tomography (SD-OCT).

Figure 7B:
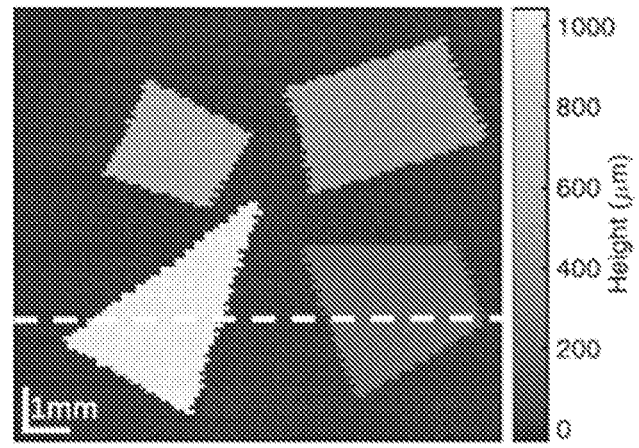
FIG. 7B is a three-dimensional (3D) time-of-flight (ToF) image of the pieces of glass of FIG. 7A taken with experimental set-up for TM-TCSPC shown in FIG. 4.
Figure 7C:
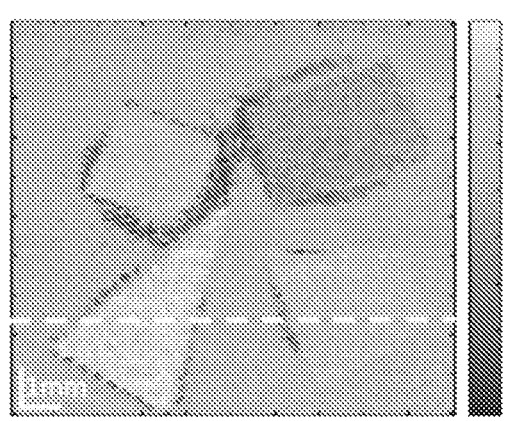
FIG. 7C is a 3D ToF image of the pieces of glass of FIG. 7A taken with conventional TCSPC.
Figure 7D:
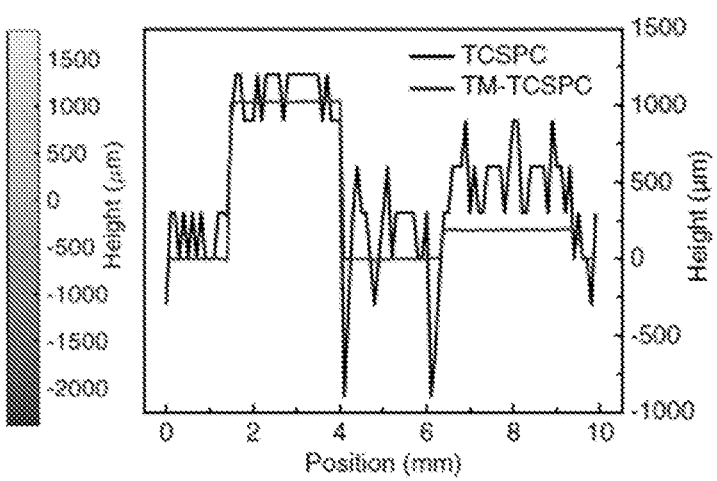
FIG. 7D is a plot comparing the heights of the pieces of glass of FIG. 7A, as measured with TM-TCSPC and conventional TCSPC.

To acquire the ToF 3D image, the sample was put under a low-resolution confocal microscope with the TM-TCSPC attached to the return signal port. Each timing histogram was denoised by a lowpass filter before its peak is located and translated from time to depth. The resulting ToF 3D image is shown in FIG. 7B. The heights of all four glass pieces were differentiated even with only a 120-μm height difference between the upper two glass pieces. The measured heights were 565 μm (upper left), 382 μm (upper right), 1010 μm (lower left), and 182 μm (lower right), which matched well with the SD-OCT calibration results. The measurement accuracy, defined as the r.m.s. error between TM-TCSPC measurement and SD-OCT calibration, is calculated to be 26 μm. The limit of the measurement accuracy will be discussed in the next paragraph. Besides, the TM-TCSPC featured high measurement precision. As shown in the lighter trace of FIG. 7D, the height measurement along the white dashed line shows a standard deviation of only 3 μm. By comparison, the ToF 3D image obtained using conventional TCSPC is shown in FIG. 7C and the height variation along the same line as that in FIG. 7C is shown as the black trace in FIG. 7D. Evidently, TM-TCSPC offers orders-of-magnitude higher measurement precision and accuracy over conventional TCSPC. More significantly, conventional TCSPC image shows much more evident cross-talk between depth and intensity information. Specifically shown in FIG. 7D, the measured height of the bottom right glass piece has a large error of 350 μm and the glass edges were even measured to exhibit negative heights that were unphysical. Such cross-talk stems from the photon pile-up effect in SPAD and is referred to as range walk error (RWE) in photon counting ToF 3D imaging systems. A 15-ps RWE was observed when the detection probability increased from 0.1% to 1%, a range typically used for TCSPC. Such a phenomenon is detrimental for high-resolution ToF 3D imaging because it not only results in mm scale depth error but also severely limits the intensity dynamic range. While RWE still exists in the TM-TSCPC, it is significantly suppressed by 99.2% (130 times) thanks to the selective temporal magnification of the depth-induced timing. As a result, the RWE is reduced to 19 μm, which is in good agreement with the 26-μm measurement accuracy shown in FIG. 5.

While the above discussion describes the time lens 114 as a parametric time lens based on FWM-BS, other nonlinear optical processes may be used to create parametric time lens. In one embodiment, the time lens 114 is implemented using difference frequency generation. In another embodiment, the time lens 114 is implemented using sum frequency generation. Another nonlinear optical process may be used to implement a parametric time lens without departing from the scope hereof.

Figure 8:
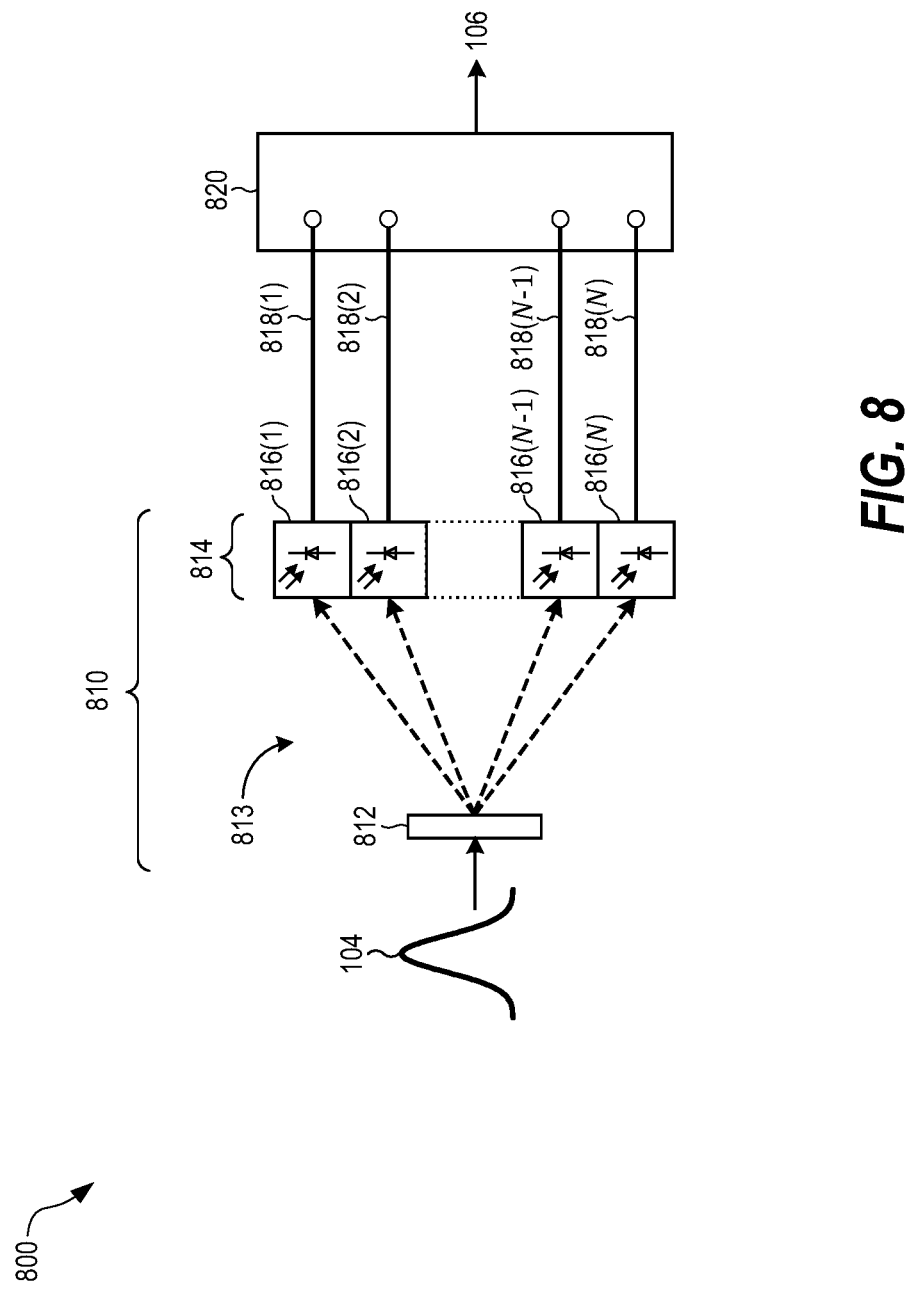
FIG. 8 is a functional diagram of an SMS that may be used with the single-photon timing system of FIG. 1, in an embodiment.

FIG. 8 is a functional diagram of an SMS 800 that is an example of the SMS 120 of FIG. 1. The SMS 800, which falls in the first category of SMS devices described above, includes a spectrometer 810 that spatially disperses and detects the transformed pulse 104. In the example of FIG. 8, the spectrometer 810 includes a dispersive element 812 that spatially disperses the transformed pulse 104 into a spatially-dispersed pulse 813. Examples of the dispersive element 812 include, but are not limited to, a diffractive grating (either transmissive or reflective), an echelle grating, an arrayed waveguide grating, a refractive prism, and a virtually imaged phase array (VIPA). The spectrometer 810 also includes a plurality of N single-photon detectors 816(1) . . . 816(N) that are arranged as a single-photon detector array 814, where N is an integer greater than 1. Examples of the detector array 814 include a single-photon avalanche diode array (SPAD) and a multi-channel superconducting nanowire single-photon detector. A SPAD array is also known as a multi-pixel photon counter, a silicon-photomultiplier array, and a solid-state photomultiplier array.

The detector array 814 is a one-dimensional array positioned to detect the spatially-dispersed pulse 813. Specifically, each of the single-photon detectors 816(1) . . . 816(N) is positioned to detect a corresponding spectral band of the spectrum $A_t(\omega)$ of the transformed pulse 104. Since the temporal features of the initial pulse 102 have been mapped onto frequency by the time-to-frequency converter 110, the arrival time of the initial pulse 102 can be inferred from which of the single-photon detectors detects the transformed pulse 104. Each single-photon detector 816(i) has a corresponding output 818(i) The SMS 800 also includes an electronic signal processor 820 that processes the outputs 818(1) . . . 818(N) to identify which single-photon detector 816(i), of the single-photon detectors 816(1) . . . 816(N), has detected a single photon. The signal processor 820 can then determine the arrival time 106 based on the single-photon detector 816(i).

The SPTR that can be achieved with the SMS 800 therefore depends not only on the properties of the time-to-frequency converter 110 (e.g., the dispersions $D_0$ and $D_f$), but also the spectral resolution of the spectrometer 810. The measurement time window T that can be obtained with the SMS 800 is advantageously larger than what can typically be achieved with TM-TCSPC. Furthermore, by using several single-photon detectors, the SMS 800 can achieve a higher photon count rate than conventional TCSPC, which is important for applications like fluorescence lifetime measurements and fluorescence lifetime imaging microscopy. To better understand this advantage, consider that in conventional TCSPC, which uses only one single-photon detector, the maximum count rate is typically limited by the pile-up effect (i.e., more than one photon being detected within the integration time of the detector). However, for an array of single-photon detectors, the pile-up effect is significantly reduced because an incoming stream of single-photon pulses will be detected by several single-photon detectors, not just one. Equivalently, the probability of two photons reaching any single pixel of the detector array within its integration time is significantly reduced. Accordingly, the photon count rate can be advantageously increased, thereby speeding up data acquisition.

As an example of the higher count rates that can be achieved with the SMS 800 of FIG. 8, consider a 32×32 SPAD camera operating at a photon counting rate of 30 MHz. Assuming the ideal scenario that photons hit the 256 pixels with equal probability, the chance of two photons hitting the same pixel at the same time is less than 10% with a total of seven detected photons per pulse. Thus, the effective maximum photon counting rate per pixel is increased by a factor of seven to 210 MHz (=7×30 MHz). Additional single-photon detectors in the array can reduce pile-up even more, allowing even higher effective photon counting rates.

Figure 9:
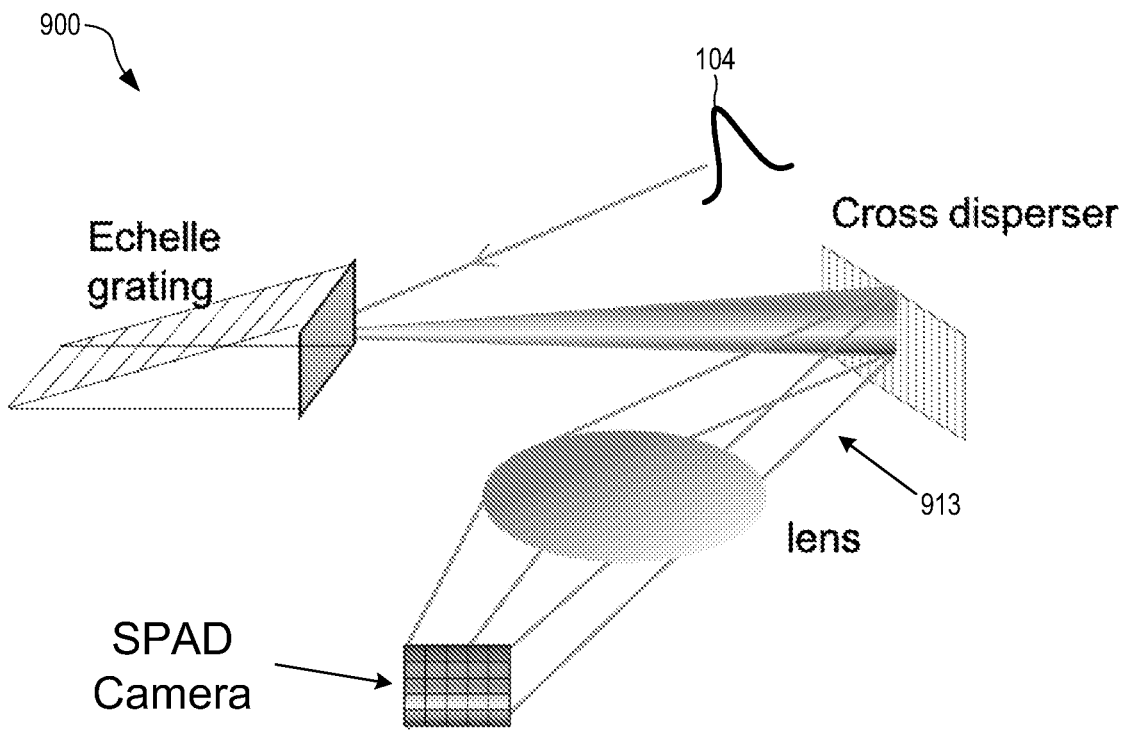
FIG. 9 shows a two-dimensional photon-counting spectrometer that may be used with the SMS of FIG. 8, in embodiments.

FIG. 9 shows a two-dimensional photon-counting spectrometer 900 that is one example of the spectrometer 810 of FIG. 8. The spectrometer 900 consists of two dispersers that map spectral components of the transformed pulse 104 into two spatial dimensions. The spectrometer 900 also includes a two-dimensional SPAD camera that detects a two-dimensional spatially-dispersed pulse 913. In FIG. 9, the first disperser is a vertical disperser that provides high angular dispersion by diffracting the spectrum into multiple overlapping high orders. Examples of the first disperser include, but are not limited to, an Echelle grating (as shown in FIG. 9), immersion grating, and virtually imaged phase array, and arrayed waveguide grating. The second disperser, or cross disperser, may be a lower dispersion element, such as a prism or grating operating at fundamental order, that splits the overlapping orders horizontally to generate the two-dimensional spatially-dispersed pulse 913. The design of the spectrometer 900 depends on the system record length and time resolution required for the application at hand.

In one example of the photon-counting spectrometer 900, consider a SPAD camera with 32×32 pixels. The first disperser is an Echelle grating whose blaze order n for a specific wavelength $\lambda$ can be expressed as $$n = \frac{2d \sin \theta_B}{\lambda},$$

where d is the groove pitch and $\theta_B$ is the blaze angle. Assuming d=104 µm, $\theta_B$=75°, and $\lambda$=600 nm yields n=333. The resulting free spectral range (FSR) is 600/n=1.8 nm. A 14.4-nm wide spectrum will thus be split into seven orders, and each 1.8-nm band will be vertically dispersed, which will later be sampled by 32 pixels to provide a spectral resolution of 56.2 pm (46.8 GHz). Following the echelle grating, a high-efficiency transmission grating acting as the second disperser will horizontally separate the seven orders across eight rows of detector pixels. Therefore, a total of 224 photon-counting pixels can be effectively utilized. To provide a temporal resolution of 5 ps, the group delay dispersion $D_0$ can be calculated as 5 ps/52 GHZ/2π=17 ps². The corresponding recording time window is about 1.28 ns. Alternatively, if 5 ns recording length is desired, the group delay dispersion $D_0$ should be increased to 66.6 ps². However, since the spectral resolution is fixed at 52 GHZ, the corresponding timing resolution will be degraded to around 20 ps.

When the light incidence angle equals the blaze angle of the Echelle grating, the angular dispersion angle $\Delta\beta$ of each FSR is approximately $$\Delta\beta = \frac{2\tan(\theta_B)}{n}.$$

Numerically for this example, $\Delta\beta$ is about 0.035 rad. Assuming the SPAD camera has a pixel pitch of 50 µm, 32 pixels span 1.6 mm. Therefore a lens or parabolic mirror with a focal length of 1.6 mm/0.035=45 mm can achieve 32 spectral sampling points within one FSR. The most straightforward requirement for the angular dispersion of the cross disperser is that the vertical separation of each order (spectral separation of one FSR) on the SPAD camera should equal one vertical pixel pitch. Therefore, the angular dispersion can be calculated as $$\frac{\Delta\beta}{\Delta\lambda} = \frac{\frac{50\ \mu m}{45\ mm}}{2\ nm} = 0.55\ \text{mrad/nm}.$$

The angular dispersion of a conventional grating working at fundamental order can be written as $$\frac{d\beta}{d\lambda} = \frac{1}{2d\cos(\theta_B)}.$$

For common gratings that have blazing angle around 45°, the corresponding groove pitch is around 0.4 µm, i.e., 2500 lines/mm.

The photon efficiency of the spectrometer 900 mainly depend on the diffraction efficiency of the gratings and the photon collection efficiency of the SPAD camera. Even though the filling factor of SPAD array is low (around 1%), the camera can be equipped with a micro-lens array that effectively enhances the photon collecting efficiency by about ten times for uniform 2D illumination. In addition, since the two-dimensional spatially-dispersed pulse 913 is discrete in the horizontal direction, the filling factor only influences the vertical direction. Therefore photon collection efficiency over 30% is expected. For the diffraction efficiency of the echelle grating, since the central wavelength of each order is diffracted at blazing angle, near-optimal efficiency of around 80% is expected for all orders. In addition, standard commercial holographic gratings of 2500 lines/mm for visible light provide an efficiency of around 60%. Overall, a photon collection efficiency of around 15% is expected.

Figure 10:
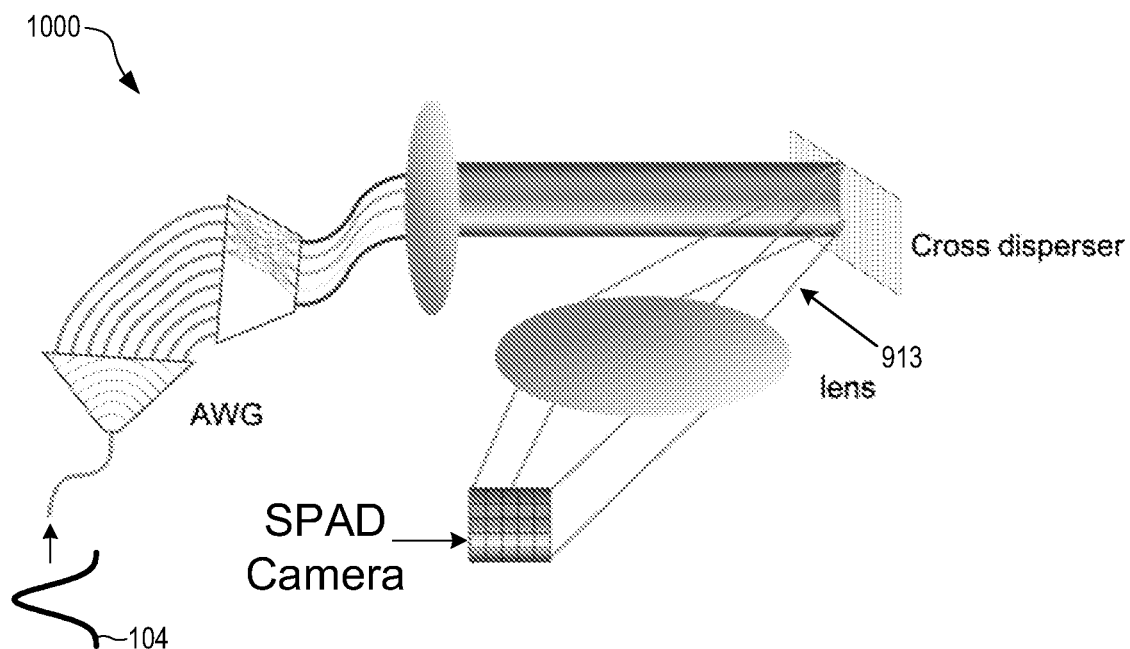
FIG. 10 shows a two-dimensional photon-counting spectrometer that is one example of the two-dimensional photon-counting spectrometer of FIG. 9, in an embodiment.

FIG. 10 shows a two-dimensional photon-counting spectrometer 1000 that is one example of the spectrometer 900 of FIG. 9. Continuing from the example above, if a 5-ns record length and 5-ps resolution are desired simultaneously, a signal dispersion of 66.6 ps² is required and the spectrometer resolution will need to be improved to 12 GHz (14.4 pm). Therefore, a disperser with an FSR of 0.46 nm (383 GHZ) is required. While it is hard to realize with common high-order dispersers such as echelle gratings and virtually imaged phase arrays, a 400-GHz FSR is commonly achieved with an arrayed waveguide grating (AWG). Ultra-low loss of 0.5 dB has been demonstrated in the visible range. The transformed pulse 104 is coupled into the AWG through a single-mode input fiber. The output is a fiber bundle, which may have 32 bare fibers tightly assembled together vertically. The output of the fiber bundle will be collimated first and then illuminated onto a cross disperser to horizontally disperse each 0.46-nm bandwidth onto a 32-pixel row to provide a spectral resolution of 14.4 pm. In this way, a total of 32×32 pixels can be utilized to measure the bandwidth of 12 THz.

Referring to FIG. 1, the time-to-frequency converter 110 can be converted into a Fourier processor by adding an additional dispersive element that applies the group delay dispersion $D_0$ to the transformed pulse 104. Since a dispersive element cannot change the spectrum of a pulse, the output of the Fourier processor will have the same spectrum $\tilde{A}_t(\omega)$ as the transformed pulse 104. Accordingly, the additional dispersive element will have no impact on measurements of the arrival time, and is therefore not necessary. Excluding this additional dispersive element not only simplifies the system 100 by keeping component count low, but it also reduces loss and improves the performance of the time-to-frequency converter 110 by preventing additional third-order dispersion from being applied to the transformed pulse 104.

Combination of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) A single-photon timing method includes applying an initial group delay dispersion to an initial single-photon pulse to generate a chirped single-photon pulse. The single-photon timing method also includes passing the chirped single-photon pulse through a time lens to generate a transformed single-photon pulse. The time lens has a focal group delay dispersion similar to the initial group delay dispersion. The single-photon timing method also includes measuring a spectrum of the transformed single-photon pulse to determine a single-photon arrival time of the initial single-photon pulse.

(A2) In the single-photon timing method denoted (A1), the method further includes outputting the single-photon arrival time.

(A3) In either of the single-photon timing methods denoted (A1) and (A2), said passing includes dispersing a pump pulse to create a chirped pump pulse, the chirped pump pulse having a chirped-pump spectrum centered at a chirped-pump center frequency that is different from an initial center frequency of an initial spectrum of the initial single-photon pulse. Said passing also includes generating a quasi-continuous-wave (CW) pump having a quasi-CW-pump spectrum centered at a quasi-CW-pump center frequency that is different from the initial center frequency and the chirped-pump center frequency. Said passing also includes applying nonlinear frequency generation to the chirped pump pulse, the quasi-CW pump, and the chirped single-photon pulse to generate the transformed single-photon pulse.

(A4) In the single-photon timing method denoted (A3), said applying nonlinear frequency generation includes applying four-wave mixing Bragg scattering. The spectrum of the transformed single-photon pulse is centered at a transformed center frequency that is offset from the initial center frequency by the difference between the chirped-pump center frequency and the quasi-CW-pump center frequency.

(A5) In the single-photon timing method denoted (A3), said applying nonlinear frequency generation includes applying sum frequency generation or difference frequency generation. The spectrum of the transformed single-photon pulse is centered at a transformed center frequency that is offset from the initial center frequency by the chirped-pump center frequency.

(A6) In any of the single-photon timing methods denoted (A3)-(A5), said generating the quasi-CW pump includes modulating a CW pump beam synchronously with the chirped pump pulse.

(A7) In any of the single-photon timing methods denoted (A1)-(A6), said measuring includes applying a final group delay dispersion to the transformed single-photon pulse to generate a time-magnified single-photon pulse. The final group delay dispersion is greater than the initial group delay dispersion. Said measuring also includes performing time-correlated single-photon counting to measure a time-magnified arrival time of the time-magnified single-photon pulse. Said measuring also includes dividing the time-magnified arrival time by the ratio of the initial and final group delay dispersions to obtain the single-photon arrival time.

(A8) In the single-photon timing method denoted (A7), said performing time-correlated single-photon counting includes measuring the time-magnified single-photon pulse with a single-photon detector.

(A9) In any of the single-photon timing methods denoted (A1)-(A6), said measuring includes spatially dispersing the transformed single-photon pulse into a spatially-dispersed single-photon pulse and detecting the spatially-dispersed single-photon pulse with a single-photon detector array.

(A10) In the single-photon timing method denoted (A9), said detecting includes detecting with one of: a single-photon avalanche diode array, a multi-channel superconducting nanowire single-photon detector, and a multi-pixel photon counter.

(B1) A single-photon timing system includes an initial dispersive element that, when an initial single-photon pulse passes therethrough, applies an initial group delay dispersion to the initial single-photon pulse to generate a chirped single-photon pulse. The single-photon timing system also includes a time lens that, when the chirped single-photon pulse passes therethrough, applies a focal group delay dispersion to the chirped single-photon pulse to generate a transformed single-photon pulse, the focal group delay dispersion being similar to the initial group delay dispersion. The single-photon timing system also includes a spectrum-measuring system that, in response to receiving the transformed single-photon pulse, measures a spectrum of the transformed single-photon pulse to determine a single-photon arrival time of the initial single-photon pulse.

(B2) In the single-photon timing system denoted (B1), the spectrum-measuring system is operable to output the single-photon arrival time.

(B3) In either of the single-photon timing systems denoted (B1) and (B2), the time lens includes a pump dispersing element that, when a pump pulse passes therethrough, disperses the pump pulse to generate a chirped pump pulse, the chirped pump pulse having a chirped-pump spectrum centered at a chirped-pump center frequency that is different from an initial center frequency of an initial spectrum of the initial single-photon pulse. The time lens also includes a quasi-continuous-wave (CW) pump source operable to output a quasi-CW pump having a quasi-CW-pump spectrum centered at a quasi-CW-pump center frequency that is different from the initial center frequency and the chirped-pump center frequency. The time lens also includes a nonlinear optical element that, when illuminated by the chirped pump pulse, quasi-CW pump, and chirped single-photon pulse, implements nonlinear frequency generation to generate the transformed single-photon pulse.

(B4) In the single-photon timing system denoted (B3), the nonlinear optical element, when illuminated by the chirped pump pulse, quasi-CW pump, and chirped single-photon pulse, implements four-wave mixing Bragg scattering. The spectrum of the transformed single-photon pulse is centered at a transformed center frequency that is offset from the initial center frequency by the difference between the chirped-pump center frequency and the quasi-CW-pump center frequency.

(B5) In the single-photon timing system denoted (B3), the nonlinear optical element, when illuminated by the chirped pump pulse, quasi-CW pump, and chirped single-photon pulse, implements sum frequency generation or difference frequency generation. The spectrum of the transformed single-photon pulse is centered at a transformed center frequency that is offset from the initial center frequency by the chirped-pump center frequency.

(B6) In any of the single-photon timing systems denoted (B3)-(B5), the quasi-CW pump source includes a modulator operable to modulate a CW pump beam synchronously with the chirped pump pulse.

(B7) In any of the single-photon timing systems denoted (B1)-(B6), the spectrum-measuring system includes a final dispersive element that, when the transformed single-photon pulse passes therethrough, applies a final group delay dispersion to the transformed single-photon pulse to generate a time-magnified single-photon pulse, the final group delay dispersion being greater than the initial group delay dispersion. The spectrum-measuring system also includes a time-correlated single-photon-counting system that, in response to receiving the time-magnified single-photon pulse, measures a time-magnified arrival time of the time-magnified single-photon pulse. The spectrum-measuring system also includes a signal processor operable to divide the time-magnified arrival time by the ratio of the initial and final group delay dispersions to determine the single-photon arrival time.

(B8) In the single-photon timing system denoted (B7), the time-correlated single-photon-counting system includes a single-photon detector.

(B9) In any of the single-photon timing systems denoted (B1) (B6), the spectrum-measuring system includes a spectrometer operable to spatially disperse the transformed single-photon pulse into a spatially-dispersed single-photon pulse and a single-photon detector array positioned to detect the spatially-dispersed single-photon pulse.

(B10) In the single-photon timing system denoted (B9), the single-photon detector array includes one of: a single-photon avalanche diode array, a multi-channel superconducting nanowire single-photon detector, and a multi-pixel photon counter.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A single-photon timing method, comprising:
applying an initial group delay dispersion to an initial single-photon pulse to generate a chirped single-photon pulse;
passing the chirped single-photon pulse through a time lens to generate a transformed single-photon pulse, the time lens having a focal group delay dispersion similar to the initial group delay dispersion; and
measuring a spectrum of the transformed single-photon pulse to determine a single-photon arrival time of the initial single-photon pulse.

2. The single-photon timing method of claim 1, further comprising outputting the single-photon arrival time.

3. The single-photon timing method of claim 1, wherein said passing includes:
dispersing a pump pulse to create a chirped pump pulse, the chirped pump pulse having a chirped-pump spectrum centered at a chirped-pump center frequency that is different from an initial center frequency of an initial spectrum of the initial single-photon pulse;
generating a quasi-continuous-wave (CW) pump having a quasi-CW-pump spectrum centered at a quasi-CW-pump center frequency that is different from the initial center frequency and the chirped-pump center frequency; and
applying nonlinear frequency generation to the chirped pump pulse, the quasi-CW pump, and the chirped single-photon pulse to generate the transformed single-photon pulse.

4. The single-photon timing method of claim 3, wherein:
said applying nonlinear frequency generation includes applying four-wave mixing Bragg scattering; and
the spectrum of the transformed single-photon pulse is centered at a transformed center frequency that is offset from the initial center frequency by the difference between the chirped-pump center frequency and the quasi-CW-pump center frequency.

5. The single-photon timing method of claim 3, wherein:
said applying nonlinear frequency generation includes applying sum frequency generation or difference frequency generation; and
the spectrum of the transformed single-photon pulse is centered at a transformed center frequency that is offset from the initial center frequency by the chirped-pump center frequency.

6. The single-photon timing method of claim 3, wherein said generating the quasi-CW pump includes modulating a CW pump beam synchronously with the chirped pump pulse.

7. The single-photon timing method of claim 1, wherein said measuring includes:
applying a final group delay dispersion to the transformed single-photon pulse to generate a time-magnified single-photon pulse, the final group delay dispersion being greater than the initial group delay dispersion;
performing time-correlated single-photon counting to measure a time-magnified arrival time of the time-magnified single-photon pulse; and
dividing the time-magnified arrival time by the ratio of the initial and final group delay dispersions to obtain the single-photon arrival time.

8. The single-photon timing method of claim 7, wherein said performing time-correlated single-photon counting includes measuring the time-magnified single-photon pulse with a single-photon detector.

9. The single-photon timing method of claim 1, wherein said measuring includes:
spatially dispersing the transformed single-photon pulse into a spatially-dispersed single-photon pulse; and
detecting the spatially-dispersed single-photon pulse with a single-photon detector array.

10. The single-photon timing method of claim 9, wherein said detecting includes detecting with one of: a single-photon avalanche diode array, a multi-channel superconducting nanowire single-photon detector, and a multi-pixel photon counter.

11. A single-photon timing system, comprising:
an initial dispersive element that, when an initial single-photon pulse passes therethrough, applies an initial group delay dispersion to the initial single-photon pulse to generate a chirped single-photon pulse;
a time lens that, when the chirped single-photon pulse passes therethrough, applies a focal group delay dispersion to the chirped single-photon pulse to generate a transformed single-photon pulse, the focal group delay dispersion being similar to the initial group delay dispersion; and
a spectrum-measuring system that, in response to receiving the transformed single-photon pulse, measures a spectrum of the transformed single-photon pulse to determine a single-photon arrival time of the initial single-photon pulse.

12. The single-photon timing system of claim 11, the spectrum-measuring system being operable to output the single-photon arrival time.

13. The single-photon timing system of claim 11, the time lens comprising:
a pump dispersing element that, when a pump pulse passes therethrough, disperses the pump pulse to generate a chirped pump pulse, the chirped pump pulse having a chirped-pump spectrum centered at a chirped-pump center frequency that is different from an initial center frequency of an initial spectrum of the initial single-photon pulse;
a quasi-continuous-wave (CW) pump source operable to output a quasi-CW pump having a quasi-CW-pump spectrum centered at a quasi-CW-pump center frequency that is different from the initial center frequency and the chirped-pump center frequency; and
a nonlinear optical element that, when illuminated by the chirped pump pulse, quasi-CW pump, and chirped single-photon pulse, implements nonlinear frequency generation to generate the transformed single-photon pulse.

14. The single-photon timing system of claim 13, wherein:
the nonlinear optical element, when illuminated by the chirped pump pulse, quasi-CW pump, and chirped single-photon pulse, implements four-wave mixing Bragg scattering; and
the spectrum of the transformed single-photon pulse is centered at a transformed center frequency that is offset from the initial center frequency by the difference between the chirped-pump center frequency and the quasi-CW-pump center frequency.

15. The single-photon timing system of claim 13, wherein:
the nonlinear optical element, when illuminated by the chirped pump pulse, quasi-CW pump, and chirped single-photon pulse, implements sum frequency generation or difference frequency generation; and the spectrum of the transformed single-photon pulse is centered at a transformed center frequency that is offset from the initial center frequency by the chirped-pump center frequency.

16. The single-photon timing system of claim 13, the quasi-CW pump source including a modulator operable to modulate a CW pump beam synchronously with the chirped pump pulse.

17. The single-photon timing system of claim 11, the spectrum-measuring system comprising:
   a final dispersive element that, when the transformed single-photon pulse passes therethrough, applies a final group delay dispersion to the transformed single-photon pulse to generate a time-magnified single-photon pulse, the final group delay dispersion being greater than the initial group delay dispersion;
   a time-correlated single-photon-counting system that, in response to receiving the time-magnified single-photon pulse, measures a time-magnified arrival time of the time-magnified single-photon pulse; and
   a signal processor operable to divide the time-magnified arrival time by the ratio of the initial and final group delay dispersions to determine the single-photon arrival time.

18. The single-photon timing system of claim 17, the time-correlated single-photon-counting system including a single-photon detector.

19. The single-photon timing system of claim 11, the spectrum-measuring system including:
   a spectrometer operable to spatially disperse the transformed single-photon pulse into a spatially-dispersed single-photon pulse; and
   a single-photon detector array positioned to detect the spatially-dispersed single-photon pulse.

20. The single-photon timing system of claim 19, the single-photon detector array including one of: a single-photon avalanche diode array, a multi-channel superconducting nanowire single-photon detector, and a multi-pixel photon counter.

* * * * *